United States Patent

Boess

[11] Patent Number: 6,138,366
[45] Date of Patent: Oct. 31, 2000

[54] ADAPTOR FOR FIXING A MEASURING MEANS TO A VEHICLE WHEEL

[75] Inventor: Walter Boess, Gross-Rohrheim, Germany

[73] Assignee: Hofmann Werkstatt-Technik GmbH, Pfungstadt, Germany

[21] Appl. No.: 09/116,587

[22] Filed: Jul. 16, 1998

[30] Foreign Application Priority Data

Jul. 16, 1997 [DE] Germany .............. 197 30 523

[51] Int. Cl.$^7$ .................................. G01B 5/255
[52] U.S. Cl. ............................ 33/203.18; 33/520
[58] Field of Search ............... 33/203.18, 203, 33/520, 600

[56] References Cited

U.S. PATENT DOCUMENTS

| | | | |
|---|---|---|---|
| 346,048 | 7/1886 | Humphery | 33/520 |
| 1,013,911 | 1/1912 | Weber | 33/520 |
| 4,285,136 | 8/1981 | Ragan | 33/203.18 |
| 4,377,038 | 3/1983 | Ragan | 33/203.18 |
| 4,432,145 | 2/1984 | Caroff | 33/203.18 |
| 4,541,162 | 9/1985 | Halvin | 33/203.18 |
| 5,168,632 | 12/1992 | Rimlinger, Jr. | 33/203.18 |
| 5,174,032 | 12/1992 | Beck | 33/203.18 |

*Primary Examiner*—Christopher W. Fulton
*Attorney, Agent, or Firm*—Pillsbury Madison & Sutro LLP

[57] ABSTRACT

In an adaptor for fixing at least one measuring means to a motor vehicle wheel, for example when measuring the wheel position, a carrier carrying the measuring means is centered on the vehicle wheel by way of fixing means mounted displaceably with respect to the carrier, upon displacement of the fixing means.

17 Claims, 2 Drawing Sheets

ADAPTOR FOR FIXING A MEASURING MEANS TO A VEHICLE WHEEL

FIELD OF THE INVENTION

The invention concerns an adaptor for fixing a measuring means to a vehicle wheel.

In this specification the term measuring means is used to include a measuring device or a measuring unit, or alternatively a measuring element which forms an operative component of a measuring assembly.

BACKGROUND OF THE INVENTION

One form of adaptor for fixing at least one measuring means to a motor vehicle wheel, more particularly for measuring the position of the wheel, is to be found in U.S. Pat. No. 5,446,967. That adaptor provides for fixing the measuring means to the wheel with a given positional reference in relation to the wheel axis by means of a carrier for the measuring means. More specifically, the measuring means such as an angle measuring means is fixed to the carrier and the carrier is in turn fixed to the vehicle wheel by suitable fixing means so that the measuring means enjoys the above-mentioned positional reference in relation to the wheel axis. The fixing means are mounted displaceably on the carrier and are guided thereon in radial directions. By virtue of a common movement of the fixing means, they can be gripped fast to the disk portion of the vehicle wheel to produce reaction forces for centering the carrier relative to the wheel axis. For that purpose the fixing means can be fitted in positively locking relationship on to screw heads of fixing screws with which the motor vehicle wheel is secured to the vehicle.

Attention may also be directed to DE 92 06 155 U1 disclosing a fixing arrangement for fixing measuring units to motor vehicle wheels, in which a plurality of clamping sleeves can be fixedly fitted on to the wheel nuts or the wheel studs, as fixing means. The clamping sleeves are guided movably in the radial direction on the fixing arrangement. All the clamping sleeves are set to a uniform radial spacing from the center point of the fixing arrangement, as in the case of the configuration disclosed in U.S. Pat. No. 5,446,967.

DE 44 12 196 A1 also discloses an arrangement in which a carrier of an adaptor is provided with fixing means which are mounted in such a way that they can turn or tilt, and with which the carrier is to be fixed to the disk portion of the vehicle wheel. In that arrangement the fixing means are guided rotatably in directions extending perpendicularly to radial directions, by a guide means which is movable relative to the carrier.

SUMMARY OF THE INVENTION

An object of the present invention is to provide an adaptor for fixing a measuring means to a vehicle wheel with a given positional reference in relation to the wheel axis wherein the desired positional reference can be readily achieved in a manner involving simple handling when the adaptor is fixed to the vehicle wheel.

Another object of the present invention is to provide an adaptor for fixing at least one measuring means to a motor vehicle wheel in a given positional reference relative to the wheel axis, which is reliable in terms of its operational results while being of a simple structure and enjoying ease of manipulation.

Still another object of the present invention is to provide an adaptor for fixing at least one measuring means to a motor vehicle wheel which enjoys a straightforward mechanical structure for reliably guiding the measuring means into the appropriate desired position relative to the axis of the wheel in respect of which a measurement is to be made.

In accordance with the principles of the present invention the foregoing and other objects are attained by an adaptor for fixing at least one measuring means, which as indicated above includes a measuring device or a measuring element associated with or forming part of a measuring device, to a motor vehicle wheel, in a given positional reference in relation to the wheel axis, by means of a carrier for the measuring means. The adaptor has fixing means which are mounted displaceably on the carrier and with which the carrier is adapted to be fixed to the wheel disk portion of the motor vehicle wheel. The adaptor further includes a guide means by which the fixing means are guided displaceably with respect to the carrier. To produce reaction forces for centering the carrier relative to the axis of the wheel in respect of which measurements are to be taken, the fixing means can be clamped or gripped to the wheel disk portion by a common movement. The fixing means are guided displaceably on the carrier in directions extending at an angle to radial directions.

As will be seen from the description of preferred embodiments of an adaptor in accordance with the present invention, the fixing means can be secured at the wheel disk portion or preferably, on the screw heads of fixing screws used in the motor vehicle wheel in which a measurement is to be taken the fixing means are fixed to the vehicle, and are guided displaceably on the carrier in directions extending at an angle to the radial direction, by a guide means that is movable with respect to the carrier and which is preferably rotatable about an axis. During use the adaptor can be aligned with the axis of the wheel. In the common movement of the fixing means, which is implemented by the guide means or by an actuating member that is operatively associated with the guide means, the fixing means are clamped fast to the wheel portion of the motor vehicle wheel for centering the carrier with respect to the axis of the wheel or for aligning the axis of the carrier with the axis of the wheel. When that occurs, radial force components come into effect to center the carrier at the points at which the fixing means are supported on the disk portion of the wheel, more particularly for example at the above-mentioned screw heads of fixing screws. That effect provides for automatic alignment of the carrier and in particular the measuring means carried thereon, with respect to the axis of the wheel.

It will be appreciated that the rotary movement of the guide means or the actuating member operatively associated therewith can be effected by hand by the service operator. The guide means affording the above-discussed mode of operation converts the movement, in particular rotary movement, for example of the actuating member, which is produced manually by the service operator, into a motion such as to provide for the desired centering effect with respect to the axis of the wheel.

The fixing means, which for example can be fitted in positively locking relationship on the screw heads of the fixing screws with which the motor vehicle wheel can be fixed to the vehicle or which engage suitable locations on the disk portion of the wheel in positively locking relationship therewith, can be moved by the actuating member simultaneously by separate guide means associated with the respective fixing means, such as guide slots or guide levers, on separate paths or tracks afforded by the guide means. As the fixing means are disposed at different angular positions about the adaptor axis which can be aligned with the axis of the wheel, that configuration provides for automatic alignment and orientation of the carrier in the appropriate required position in relation to the wheel, and thus provides that the measuring means is suitably positioned.

In a preferred feature of the invention, the fixing means are disposed on a circle at equal angular spacings from each other around an axis which can be aligned with the axis of the wheel.

Another preferred feature of the invention provides that the guide means is of such a structure that it has an actuating member which is preferably in the form of a disk and which has guide slots therein. The guide slots extend inclinedly relative to the radial directions of the adaptor, and the fixing means are guided displaceably in respective ones of the guide slots. The guide slots can be of a rectilinear or arcuate configuration. Upon rotary movement of the actuating member the fixing means are guided slidingly with a low level of friction in the guide slots so that the desired effect of bracing the fixing means to the disk wheel or the screw heads of the fixing screws is effected with radial force components at the support locations.

In a further preferred construction the actuating member which is preferably a rotatable member is connected at pivotal mounting locations to the fixing means which are mounted to the carrier at respective pivot axis mountings. Upon rotation of the actuating member about the axis, which can be aligned with the axis of the wheel, the fixing means are pivoted until they adopt the tightened condition, which has already been discussed above, for centering of the carrier and therewith the at least one measuring means carried thereby. For that purpose the fixing means can be fixed on levers which are pivotable about the above-mentioned pivot axes on the carrier.

To replace the fixing means they can be provided releasably on the carrier at their fixing locations. The fixing means, which for example are brought into engagement with the screw heads of fixing screws, can be in the form of nuts that can be fitted on to the screw heads.

Further objects, features and advantages of the invention will be apparent from the following description of preferred embodiments thereof.

DESCRIPTION OF PREFERRED
EMBODIMENTS

Referring first generally to the drawings, the illustrated embodiments of the invention each comprise a carrier as indicated at 1, on which at least one measuring means such as at least one measuring device or one or more measuring elements forming part of a measuring assembly can be suitably fixed, for example for measuring the position of a motor vehicle wheel not shown herein. The carrier 1 is part of an adaptor of which an axis is indicated at 9 in FIGS. 1 and 3 and which can be aligned with an axis of the motor vehicle wheel in respect of which measurements are to be taken, for carrying out the measurement operation.

Figure 1:
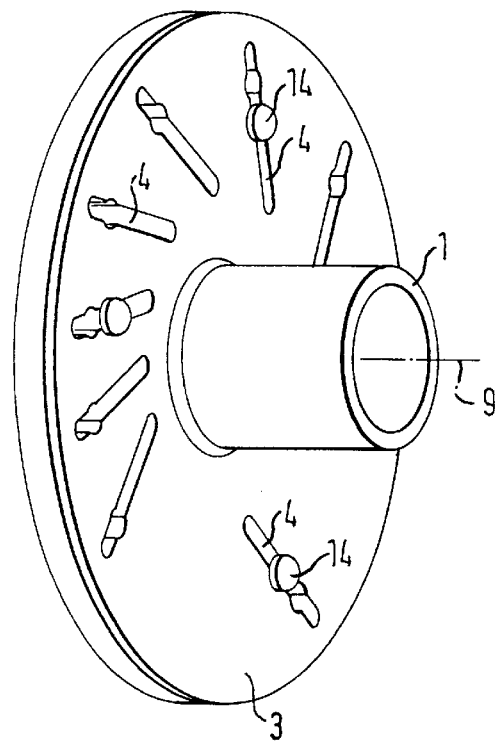
FIG. 1 is a perspective view of a first embodiment of an adaptor according to the invention.

Referring to the embodiment of FIG. 1, provided on the carrier 1 is a generally disk-shaped actuating member 3 in the form of a rotary member. The actuating member 3 has guide slots 4 which are arranged at an angle with respect to directions that are radially relative to the axis 9. That is to say the guide slots 4 extend in directions which differ from the directions that are radial relative to the axis 9. The guide slots 4 can be of a rectilinear or arcuate configuration. When the guide slots are of an arcuate configuration, the slot configurations are such that in the proximity of the outer ends the slots approach the respective tangent to a circle around the axis 9, while in their regions adjacent their respective inward ends they each approach a respective radial direction.

Figure 2:
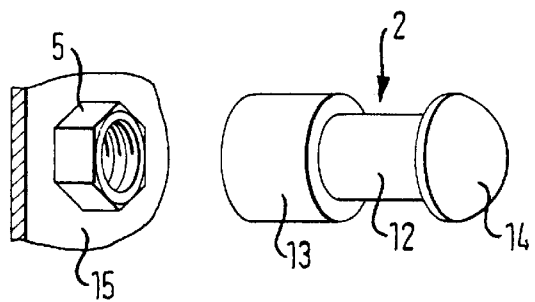
FIG. 2 is a perspective view on an enlarged scale of a fixing means which is used in the illustrated embodiments of the invention.

Referring now to FIG. 2, reference numeral 2 therein denotes fixing means which are guided in respective ones of the guide slots 4 and of which one fixing means is shown on an enlarged scale in FIG. 2. Part of the fixing means 2 can be seen in FIG. 1, as indicated by reference numeral 14, to which further reference will be made below.

Figure 4:
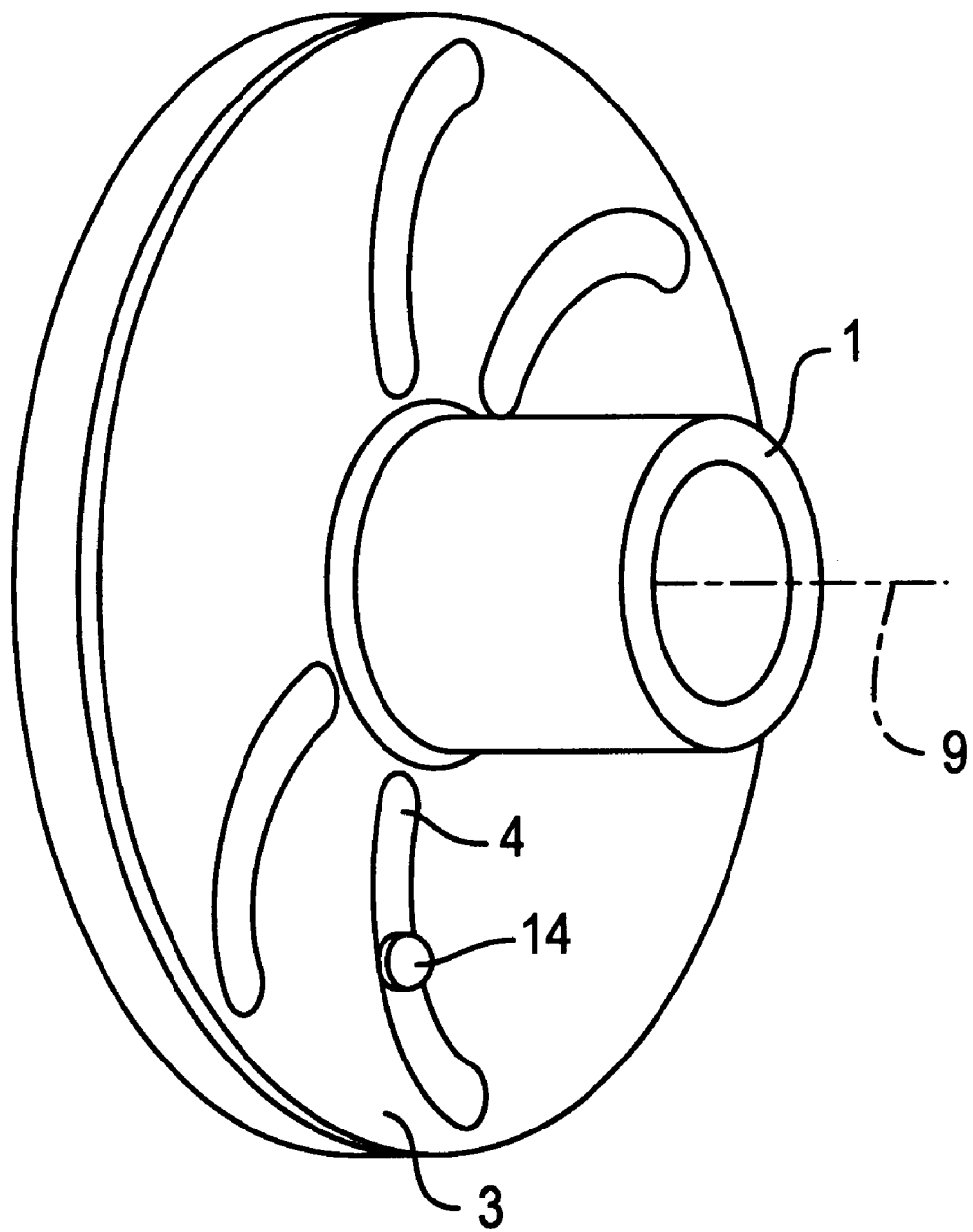

As shown in FIG. 2, the fixing means 2 illustrated therein has a connecting portion 13 such as a push-on or push-in connecting portion which can be fitted on to a screw head 5 in positively locking relationship therewith and which can be of a configuration like a nut, in conventional manner. The fixing means also has a shank 12 which is fitted for low-friction movement into a respective one of the guide slots 4. At the end remote from the connecting portion 13 the fixing means 2 has a securing portion 14 by which the fixing means 2 is secured in the axial direction in the respective guide slot 4, as illustrated in FIGS. 1 and 4. Depending on the locations at which the screw heads 5 of the fixing screws with which a motor vehicle wheel as indicated at 15 is fixed to the vehicle are disposed, suitable guide slots 4 can be appropriately positioned in the disk-shaped actuating member 3, for insertion of the fixing means 2.

The actuating member 3 with the guide slots 4 forms a guide means for the fixing means 2. Upon rotation of the disk 3 constituting the respective screw heads 5 are guided along the respective guide slots 4. In that rotary movement about the axis 9 the actuating member 3 in the form of the disk, and the carrier 1 which is rigidly or rotatably secured thereto, bear against the fixing means 2 which are fixed to or supported on the screw heads 5 or other suitable support locations. The result is the application of a radial reaction force component which, by virtue of the fixing means 2 being distributed at equal angular spacings from each other, causes the axis 9 which in the illustrated embodiment is the axis of the carrier 1 or the adaptor generally, to be aligned with the axis of the motor vehicle wheel of which a portion is indicated at 15 in FIG. 2.

As already mentioned above, the fixing means 2 can also be supported at other suitable locations on the disk portion of the wheel, from the screw heads 5, when the axis 9 is being brought into a position of alignment with the axis of the wheel, in order to produce the radially directed reaction force components which are at equal angular spacings from each other and which are required to align the axis 9 with the axis of the motor vehicle wheel, when the disk-shaped actuating member 3 is being rotated. The above-mentioned force components result from the orientation and configuration of the guide slots which include an angle with respect to the respective radial directions relative to the axis 9.

Figure 3:
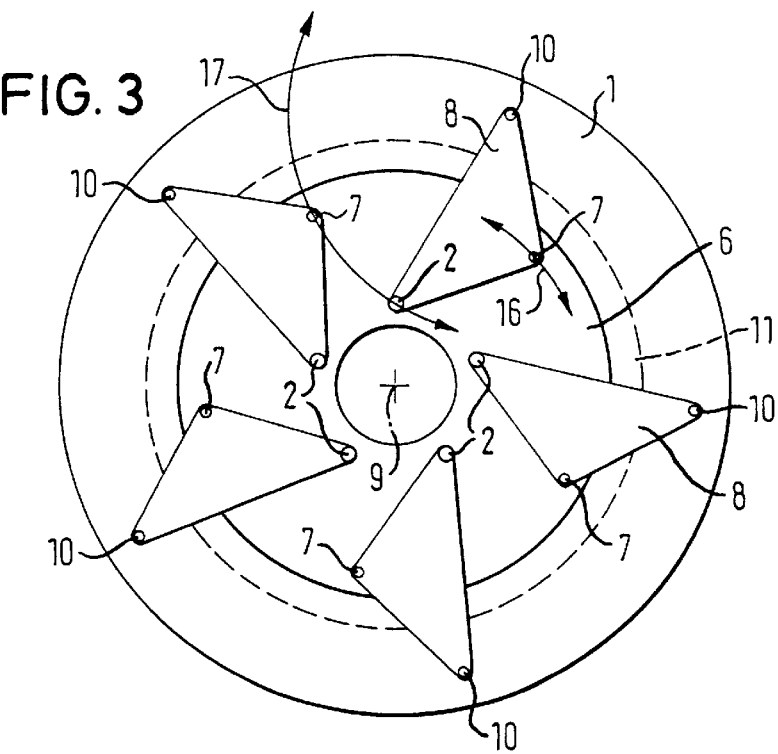
FIGS. 3 and 4 show further embodiments of an adaptor according to the invention.

Reference will now be made to FIG. 3 showing an embodiment of an adaptor according to the invention in which the fixing means 2 are mounted to the carrier 1 pivotably about pivot axes as indicated diagrammatically at 10. For that purpose the carrier 1 may have an annular member on which the pivot axes 10 are arranged preferably on a circle around the axis 9 of the adaptor assembly. The annular carrier member may have at its inward side a ring mounting arrangement 11 in which an actuating member 6 of generally ring-shaped configuration is mounted rotatably about the axis 9. Disposed on the rotatable actuating member 6 are pivotal mounting locations 7 by way of which the actuating member 6 is connected to rigid levers 8 on which the respective fixing means 2 are mounted pivotably about the pivot axes 10.

It will be seen that, when the actuating member 6 is rotated, that rotary movement is transmitted to the levers 8 by way of the pivotal mounting locations 7. In the FIG. 3 embodiment each respective pivotal mounting location 7 which may be formed for example by a pin, is fixedly connected to the actuating member 6 and rotates about the axis 9 with the actuating member 6, as indicated by the double-headed arrow 16 in FIG. 3. Provided on each lever 8 is a suitable guide means in which the pivotal mounting location 7 is slidingly guided. It is also possible for each pivotal mounting location to be fixedly connected to the respective level 8 and for a suitable sliding guide means to be provided on the actuating member 6.

The levers 8 pivot about the respective pivot axes 10 which are supported on the carrier 1 so that the fixing means 2 and the pivot axes 10 are pivoted in accordance with the rotary movement of the actuating member 6, as indicated by the double-headed arrow 17 in FIG. 3.

As already mentioned above, the fixing means 2 can be supported on the disk portion of the motor vehicle wheel of which a part is indicated at 15 in FIG. 2, at suitable locations thereon, for example at or adjacent the periphery of the wheel. It is, however, also possible for the fixing means 2 to be supported at the screw heads of the fixing screws with which the motor vehicle wheel is secured to its vehicle, as described above with reference to FIG. 2.

Upon rotation of the actuating member 6, reaction forces are exerted on the carrier 1 by way of the levers 8, and such reaction forces align the axis 9 of the carrier 1, with respect to the axis of the wheel in respect of which measurements are to be made. This therefore also provides for centering of the carrier 1 on the motor vehicle wheel, by rotation of the actuating member 6, by virtue of a centering procedure which then proceeds automatically.

The clamped condition of the fixing means, as is required for centering of the carrier 1 on the motor vehicle wheel, can be maintained by arresting the fixing means 2 in relation to the guide means as represented for example by the slots 4 in FIG. 1, for example by tightening the securing portions indicated at 14 in FIG. 2 against the disk 3 of the adaptor shown in FIG. 1. It is however also possible for the disk 3 in FIG. 1 or the annular actuating member 6 in FIG. 3 to be secured to prevent reverse rotational movement thereof by virtue of a releasable locking device.

It will be appreciated that the above-described embodiments of the present invention have been set forth solely by way of example and illustration of the principles thereof and that various modifications and alterations may be made therein without thereby departing from the spirit and scope of the invention.

What is claimed is:

1. An adaptor for fixing at least one measuring device to a vehicle wheel with a given positional reference relative to a wheel axis, including
    a carrier for the measuring device;
    a plurality of fixing means for mounting the carrier to the vehicle wheel, wherein each of said plurality of fixing means includes a connecting portion that will interfit with and be positively locked to a portion of the vehicle wheel; and
    guide means adapted to mount each of the fixing means to the carrier in a displaceably guided relationship with respect to the carrier, the fixing means being guided displaceably on the carrier in directions extending at an angle to radial directions thereof,
    wherein the plurality of fixing means are adapted to be positively locked to said vehicle wheel by a common movement to produce reaction forces for centering the carrier relative to the wheel axis.

2. An adaptor as set forth in claim 1,
    wherein said guide means includes an actuating member rotatably mounted on said carrier such that the plurality of fixing means are moved into a positively locked condition by relative rotation of the actuating member and the carrier.

3. An adaptor as set forth in claim 2
    wherein the actuating member has guide slots which extend inclinedly relative to the radial directions and in which the fixing means are displaceably guided.

4. An adaptor as set forth in claim 3
    wherein the guide slots are of a rectilinear configuration.

5. An adaptor as set forth in claim 3
    wherein the guide slots are of an arcuate configuration.

6. An adaptor as set forth in claim 2,
    wherein said plurality of fixing means are simultaneously movable by the actuating member.

7. An adaptor as set forth in claim 2
    wherein the actuating member is rotatable about an axis which in use is aligned with the wheel axis.

8. An adaptor as set forth in claim 2 including
    pivot axis means at which the fixing means are mounted pivotably on the carrier, and
    pivotal mounting locations at which the actuating member is connected to the fixing means, the pivotal mounting locations being disposed outside the pivot axis means.

9. An adaptor as set forth in claim 8
    wherein the pivotal mounting locations are disposed on a circle around an axis which in use is aligned with the wheel axis.

10. An adaptor as set forth in claim 2
    wherein the actuating member is in the form of a disk.

11. An adaptor as set forth in claim 1 including
    pivot axis means at which the fixing means are mounted pivotably on the carrier.

12. An adaptor as set forth in claim 11
    wherein the pivot axis means are disposed on a circle around an axis which in use is aligned with the wheel axis.

13. An adaptor as set forth in claim 11 including levers which carry said fixing means and which are pivotably about the pivot axis means.

14. An adaptor as set forth in claim 1 wherein the guide means are of a linear configuration to linearly guide the fixing means on the carrier.

15. An adaptor as set forth in claim 1 wherein the guide means are of an arcuate configuration to arcuately guide the fixing means on the carrier.

16. An adaptor as set forth in claim 1 wherein in the tightened condition the fixing means lie on a circle and are at equal angular spacings from each other.

17. An adaptor as set forth in claim 1 wherein the fixing means are provided releasably in their mounting locations on the carrier.

* * * * *